(12) United States Patent
Evanovich et al.

(10) Patent No.: US 8,066,871 B2
(45) Date of Patent: Nov. 29, 2011

(54) FILTRATION SYSTEM INCORPORATING MODULAR ONE-PIECE END CAPS

(75) Inventors: Steven R. Evanovich, Pittsburgh, PA (US); Alexander D Kiderman, Pittsburgh, PA (US); Michael J Schmitt, Pittsburgh, PA (US); Justin Dow, Pittsburgh, PA (US)

(73) Assignee: Schroeder Industries LLC, Bethlehem, PA (US)

( * ) Notice: Subject to any disclaimer, the term of this patent is extended or adjusted under 35 U.S.C. 154(b) by 0 days.

(21) Appl. No.: 12/581,226

(22) Filed: Oct. 19, 2009

(65) Prior Publication Data
US 2010/0032361 A1 Feb. 11, 2010

Related U.S. Application Data

(62) Division of application No. 10/360,590, filed on Feb. 7, 2003, now Pat. No. 7,604,738.

(60) Provisional application No. 60/355,237, filed on Feb. 8, 2002.

(51) Int. Cl.
*B01D 35/143* (2006.01)

(52) U.S. Cl. .......... 210/90; 210/240; 210/249; 210/252; 210/335; 210/443; 210/450

(58) Field of Classification Search .................. 210/240, 210/249, 252, 259, 323.1, 323.2, 322, 335, 210/440, 443, 444, 450, 90
See application file for complete search history.

(56) References Cited

U.S. PATENT DOCUMENTS

| 2,367,935 | A | | 1/1945 | Franck | |
| 3,237,770 | A | | 3/1966 | Humbert, Jr. | |
| 3,283,902 | A | | 11/1966 | Farris et al. | |
| 3,914,176 | A | * | 10/1975 | Holmes | 210/132 |
| 4,192,750 | A | | 3/1980 | Elfes et al. | |
| 4,786,420 | A | * | 11/1988 | Dalessandro | 210/791 |
| 5,407,571 | A | * | 4/1995 | Rothwell | 210/232 |
| 5,626,761 | A | * | 5/1997 | Howery et al. | 210/651 |
| 5,705,065 | A | | 1/1998 | Sharpe | |
| 5,798,040 | A | * | 8/1998 | Liang | 210/232 |
| 6,139,741 | A | * | 10/2000 | McGibbon | 210/323.1 |
| 6,409,920 | B1 | * | 6/2002 | Lee | 210/232 |
| 6,497,817 | B1 | * | 12/2002 | Liang | 210/232 |
| 2004/0074827 | A1 | * | 4/2004 | Sann et al. | 210/132 |

* cited by examiner

*Primary Examiner* — Matthew Savage
(74) *Attorney, Agent, or Firm* — Blynn L. Shideler; Krisanne Shideler; BLK Law Group

(57) ABSTRACT

A hydraulic filter includes a canister extending along the longitudinal axis. A closed end cap is at one end of the canister for closing one end thereof. A removable filter element is contained within the canister and a modular one-piece input end cap is at an end of the canister. The one-piece input end cap includes a hydraulic input chamber and a hydraulic output chamber which can be positioned in any one of three mutually perpendicular directions. The one-piece input end cap also allows for sensors to be positioned in any one of three mutually perpendicular directions. In addition, the one-piece input end cap can be utilized in base-ported or top-ported configurations while also allowing for side-to-side or side-to-end configurations.

32 Claims, 14 Drawing Sheets

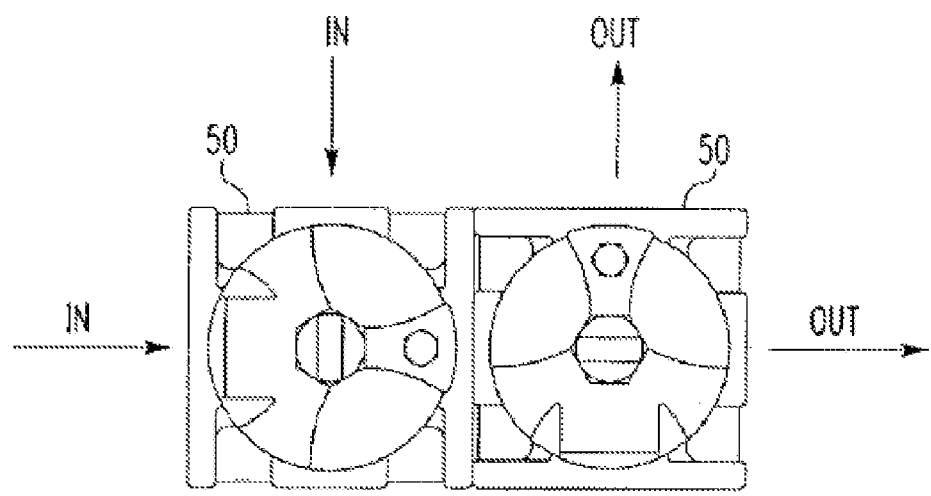
FIG.8-A
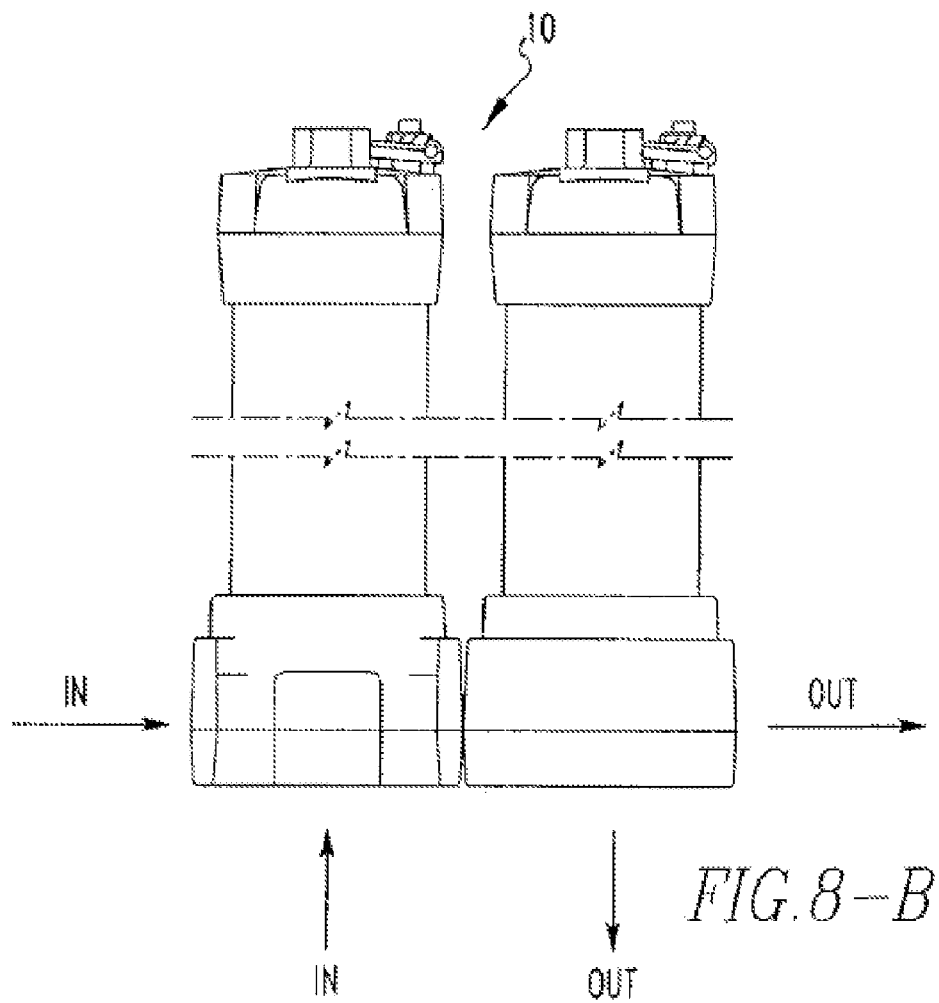
FIG.8-B

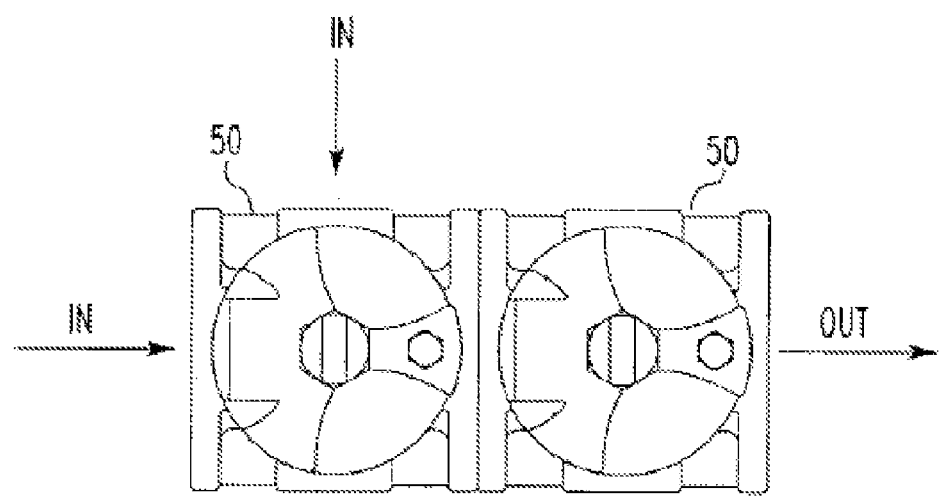
FIG.9-A
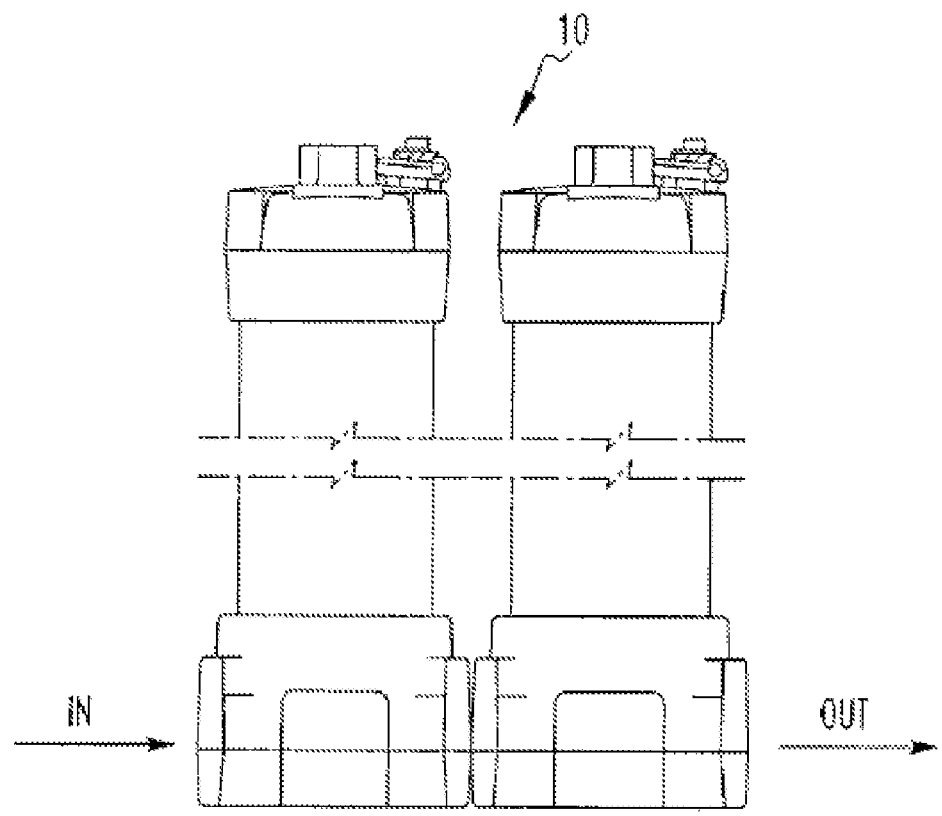
FIG.9-B

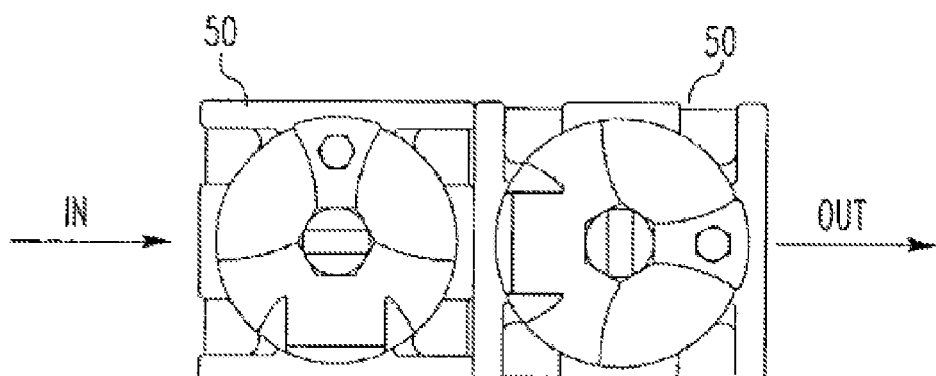
FIG.10-A
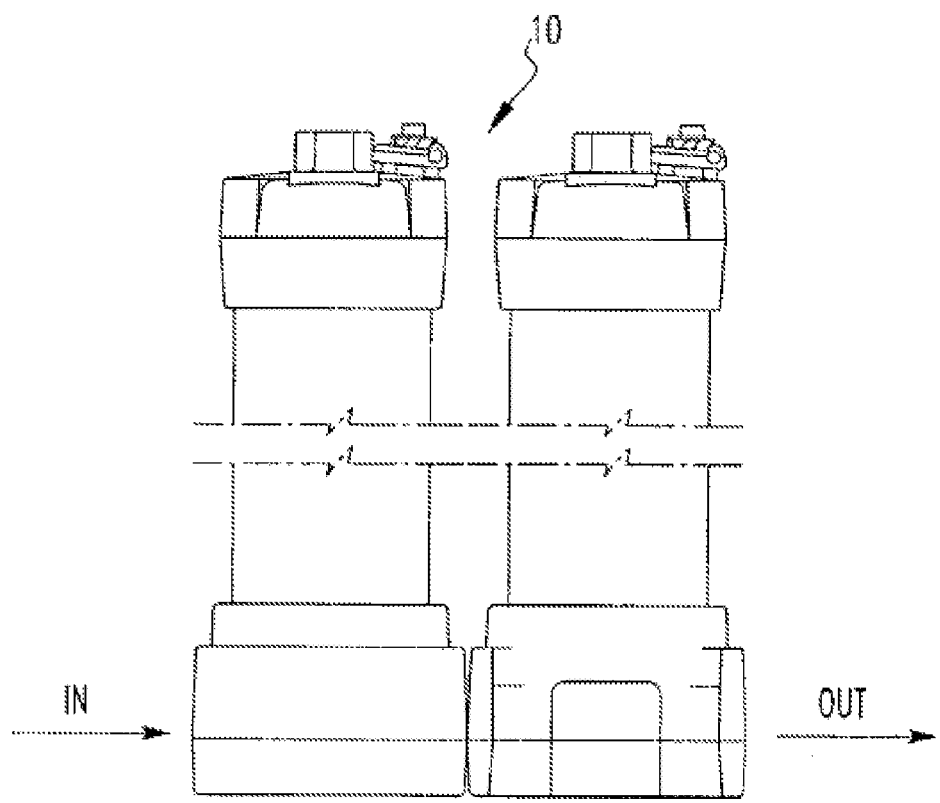
FIG.10-B

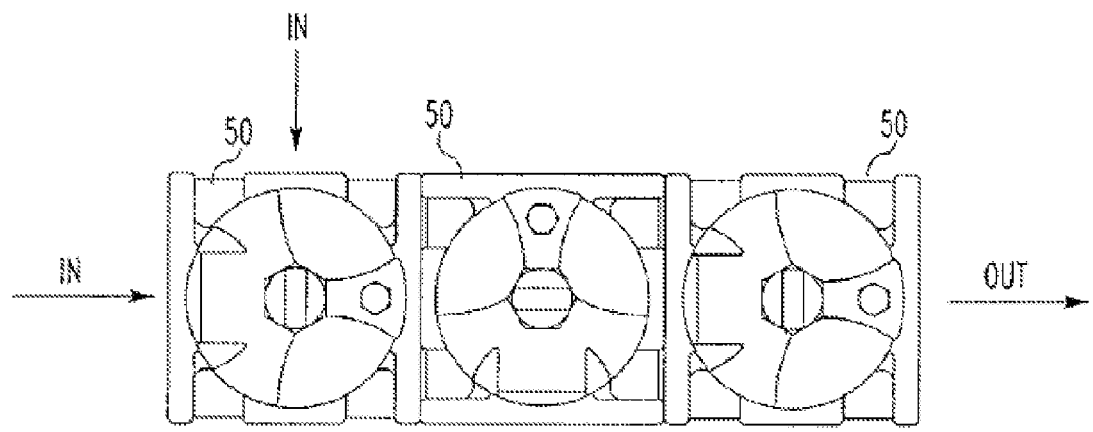
FIG.11-A
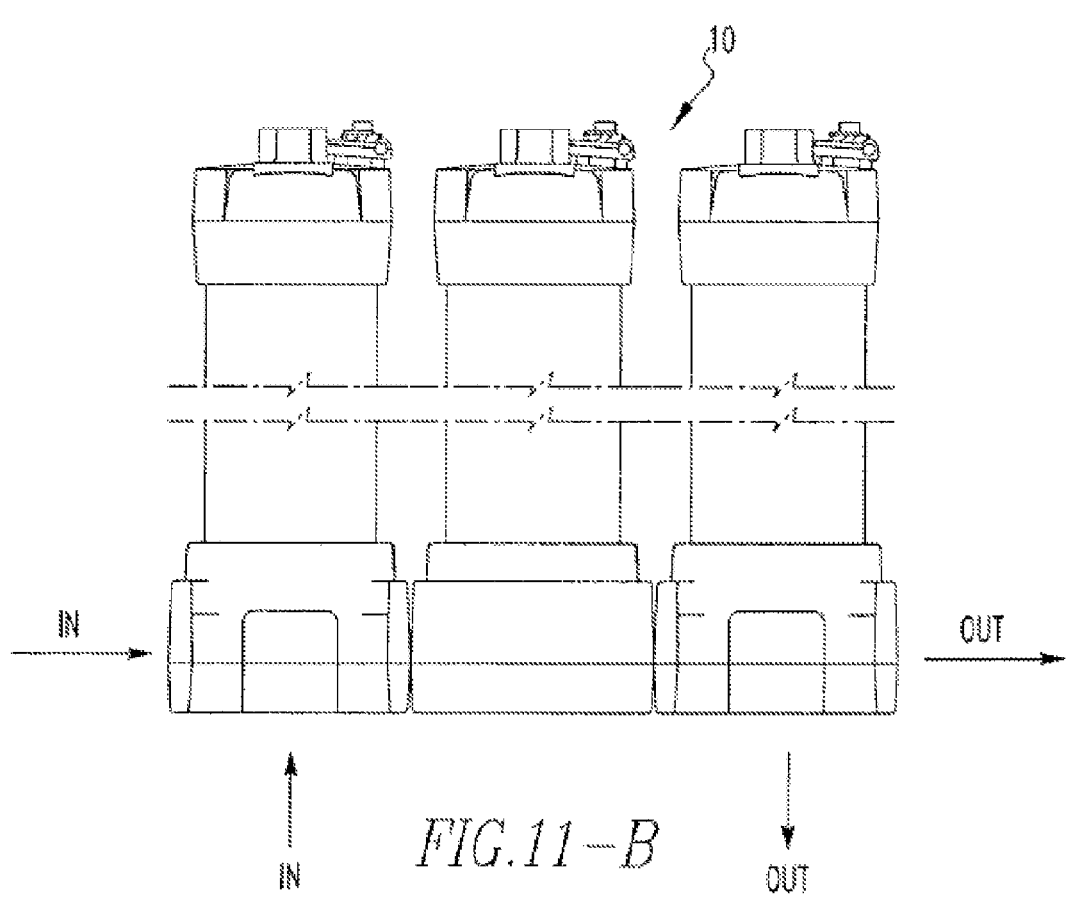
FIG.11-B

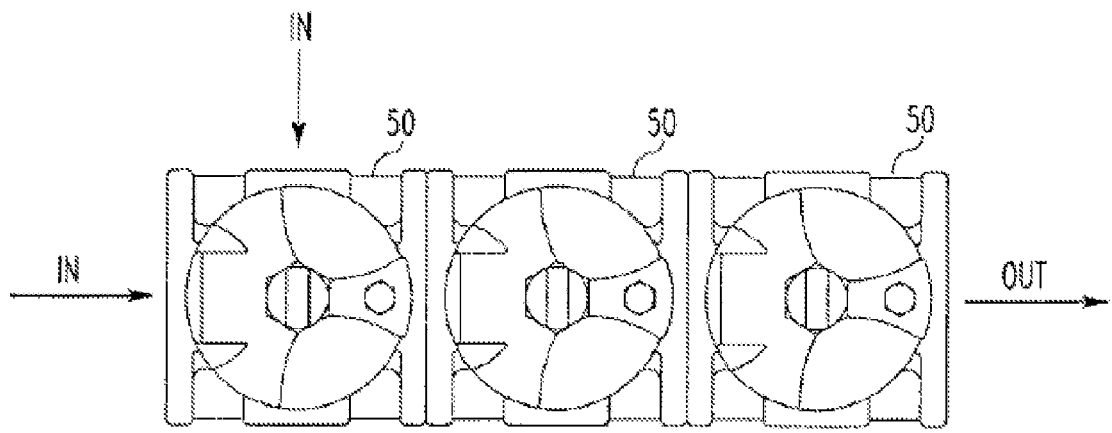
FIG.12-A
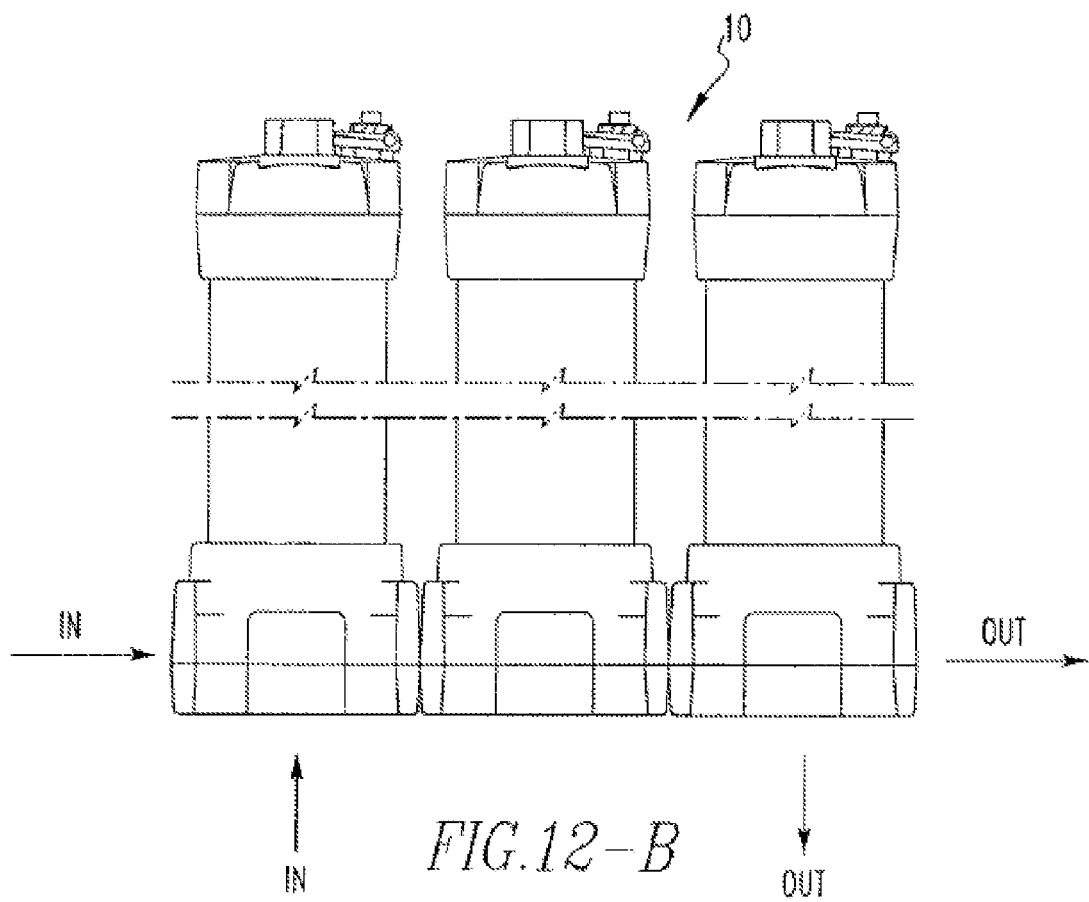
FIG.12-B

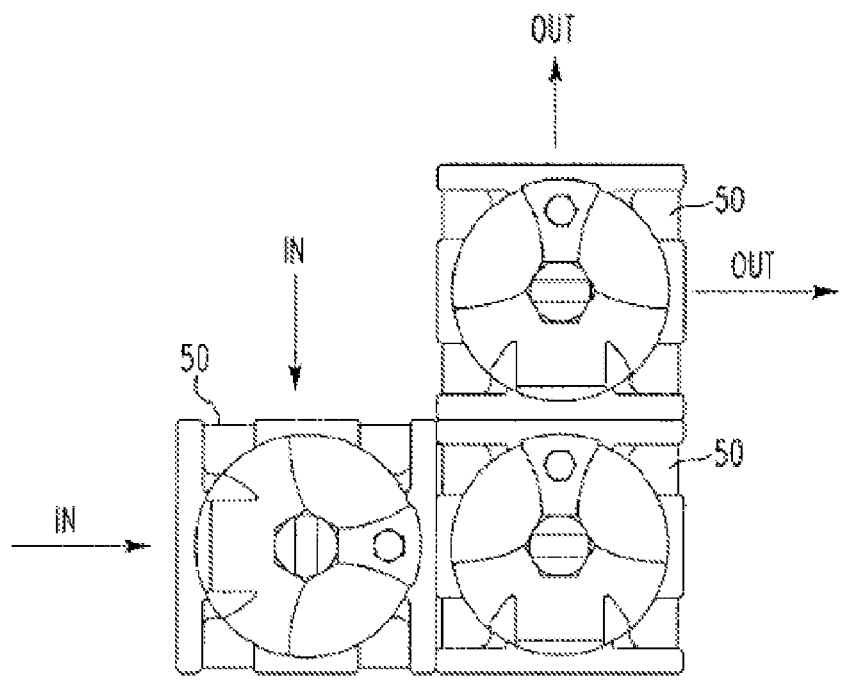
FIG.13-A
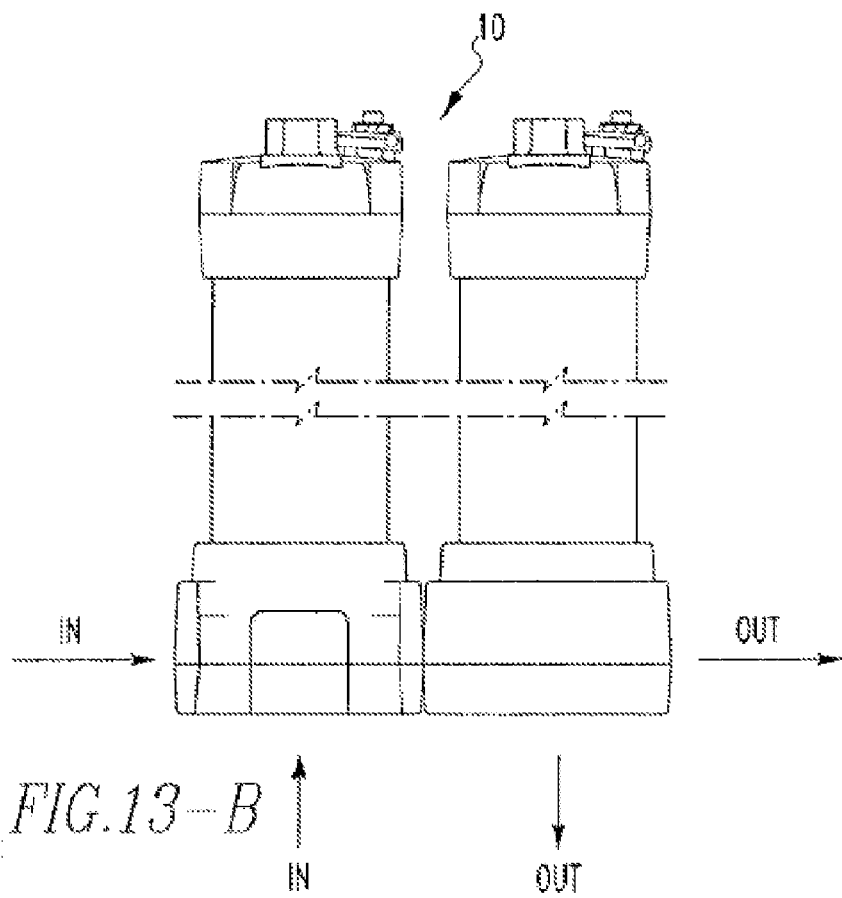
FIG.13-B

FILTRATION SYSTEM INCORPORATING MODULAR ONE-PIECE END CAPS

CROSS REFERENCE TO RELATED APPLICATION

This application is a divisional of U.S. patent application Ser. No. 10/360,590 filed on Feb. 7, 2003, now U.S. Pat. No. 7,604,738, which claims priority from U.S. Provisional Patent Application Ser. No. 60/355,237, filed Feb. 8, 2002 entitled "Hydraulic Filter with Modular One-Piece Input End Cap", which is incorporated herein by reference.

BACKGROUND OF THE INVENTION

1. Field of the Invention

The present invention relates to a hydraulic filter and, more particularly, to a one-piece input end cap, such as a base or top of a filter; this one-piece input end cap having the ability to provide multiple porting options, mounting options, sensor placements, and filtration system configurations.

2. Description of the Prior Art

Filters are generally comprised of a housing with one or more fluid inlets and one or more fluid outlets and a filter element contained in a housing. The housing is often formed of a canister and two end caps. Multiple filters have been combined in series and in parallel to form specific filtration systems. In certain applications, a single filter can also form the entire filtration system.

Filtration systems today are used in a variety of applications and most often are built or modified from the original configuration to accommodate the engineering limitations of each situation. Commonly, filters of such filtration systems have to be uniquely designed to satisfy design configurations, such as fluid inlet and outlet locations or sensor locations. Due to such demands, manufacturers are often required to design specific filters for each individual application. This, in turn, involves additional engineering steps, such as developing and manufacturing new castings for each new filter.

As can be seen, this method of having to produce a new filter to accommodate these different circumstances tends to be inefficient in time and cost. Not only would long periods of time have to be allocated for the design process of the filters and associated filtration systems, but also for the manufacturing process for the filters which, in turn, would quickly increase the cost of the product. Additionally, this process would prove to be inefficient due to low turnaround and inventory stagnation. This proves to be a cumbersome practice and can also be detrimental to a company's competitiveness and sustainability due to longer lead times and the inability to meet demand.

It is, therefore, an object of the present invention to create an efficient filter that allows for the necessary flexibility required in different applications and in design configurations, for example, the ability for the filters to be easily placed in series or parallel.

SUMMARY OF THE INVENTION

The above objects are achieved with a filter according to the present invention. The filter according to the present invention will include a canister extending along a longitudinal axis with a closed end cap at one end of the canister attached thereto and housing a removable filter element within the canister. A one-piece input end cap is at an opposite end of the canister from the closed end cap and attached to the canister. The one-piece input end cap includes a hydraulic input chamber extending to the filter element (generally the outside of a tubular filter element) and configured, for example, by machining, to be ported to an input port connector from any of three mutually perpendicular directions. The one-piece input end cap additionally includes a hydraulic output chamber extending from the filter element and configured to be ported to an output connector from any of three mutually perpendicular directions.

One embodiment of the present invention preferably includes a sensor, such as a differential pressure sensor, mounted in either the hydraulic input chamber and/or the hydraulic output chamber and adapted to extend from any of three mutually perpendicular directions from the modular one-piece input end cap.

In one embodiment of the present invention, a filtration system can be provided with individual filters adjacent and mounted directly to each other in any of two mutually perpendicular directions. The adjacent filters preferably are connected to a pump and have the ability to be connected either in series or parallel.

The present invention preferably provides a modular one-piece input end cap which includes substantially rectangular mounting flanges extending the width of the modular one-piece input end cap on opposite sides of the input end cap where one mounting flange provides a hydraulic port for the hydraulic input chamber and the other mounting plate provides a hydraulic port for the hydraulic output chamber. Additionally, the modular one-piece input end cap may include a pair of bosses on opposite ends of the modular one-piece input end cap. The pair of bosses is located in a position substantially perpendicular to the mounting plates and wherein one boss provides a hydraulic port for the hydraulic input chamber and the other boss provides a hydraulic port for the hydraulic output chamber. Further, the modular one-piece input end cap may include a cylindrical member having an axis co-linear with the axis of the canister and internal threads for attaching the canister thereto.

Another embodiment of the present invention preferably includes a manifold assembly formed integrally with the modular one-piece input end cap. The modular one-piece input end cap of the present invention may be utilized in base-ported filters or top-ported filters.

According to a preferred embodiment, a connecting end cap for a filter is provided. The filter comprises a cylindrical canister having a cylindrical axis, and a tubular filter element. The connecting end cap and a closed end cap are arranged such that the tubular filter element rests within the canister. The closed end cap seals one end of the filter element and the connecting end cap directs input flow to the exterior of the tubular filter element and output flow from the interior of the tubular filter element. The connecting end cap comprises a cup-shaped body defined by a cylindrical wall having a cylindrical axis the same as the cylindrical axis of the canister. The open end of the cylindrical wall is sized to receive the cylindrical canister and the closed end of the cup shaped body is defined by a wall perpendicular to the cylindrical axis. The connecting end cap has an input and an output chamber adjacent the closed end. The input and output chambers are separated by a wall positioned so that the inlet chamber abuts two port positions on the cylindrical wall 90 degrees apart around the cylindrical axis and such that the outlet chamber abuts two outlet port positions 180 degrees across from the inlet port positions. The outlet port chamber is further enclosed by an interior wall generally parallel to the end wall and spaced therefrom. An axial opening in the interior wall abuts the bottom end of the tubular filter element. The connecting end caps can be machined to have aligned input and output ports and/or input and output ports at right angles to each other.

These and other advantages of the present invention will be clarified in the Description of the Preferred Embodiments taken together with the attached figures wherein like reference numerals represent like elements throughout.

BRIEF DESCRIPTION OF THE DRAWINGS

The objects, advantages, and features of the present invention will be more clearly understood from the following detailed description when taken in conjunction with the accompanying drawings, in which:

FIG. 8-A is a top plan schematic view of a filtration system utilizing two filters of FIG. 15 placed in series and illustrating the available porting options;

FIG. 8-B is a schematic side view of the system of FIG. 8-A;

FIG. 9-A is a top plan schematic view of a filtration system utilizing two filters of FIG. 15 placed in series and illustrating the available porting options;

FIG. 9-B is a schematic side view of the system of FIG. 9-A;

FIG. 10-A is a top plan schematic view of a filtration system utilizing two filters of FIG. 15 placed in series and illustrating the available porting options;

FIG. 10-B is a schematic side view of the system of FIG. 10-A;

FIG. 11-A is a top plan schematic view of a filtration system utilizing three filters of FIG. 15 placed in series and illustrating the available porting options;

FIG. 11-B is a schematic side view of the system of FIG. 11-A;

FIG. 12-A is a top plan schematic view of a filtration system utilizing three filters of FIG. 15 placed in series and illustrating the available porting options;

FIG. 12-B is a schematic side view of the system of FIG. 12-A;

FIG. 13-A is a top plan schematic view of a filtration system utilizing three filters placed in series and illustrating the available porting options;

FIG. 13-B is a schematic side view corresponding to FIG. 13-A;

DESCRIPTION OF THE PREFERRED EMBODIMENTS

Figure 15:
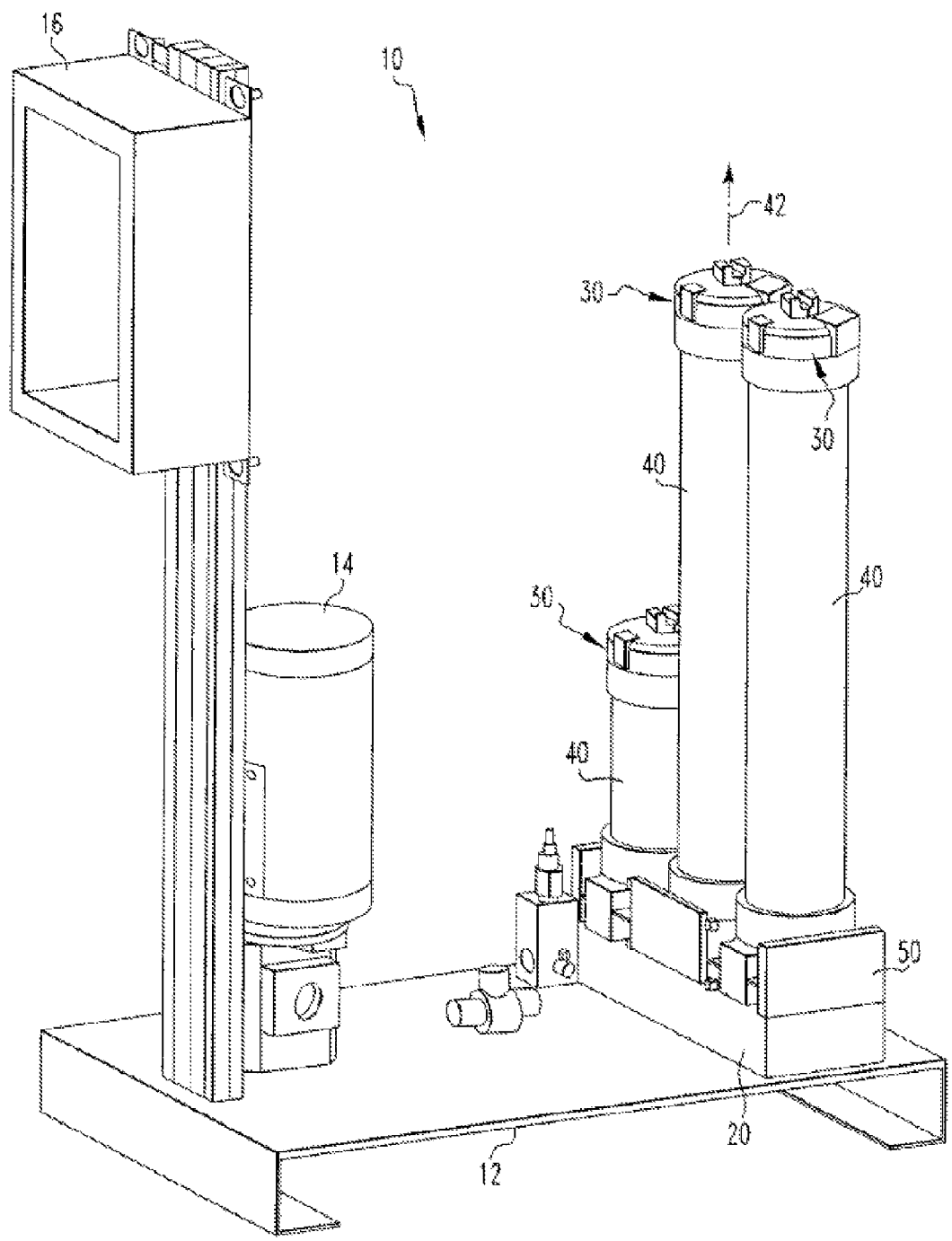
FIG. 15 is a perspective schematic view of a filtration system utilizing filters according to another embodiment of the present invention.

FIG. 15 schematically illustrates a filtration system 10 utilizing individual filters based upon a one-piece input end cap according to the present invention. The one-piece input end cap provides for flexibility in placement and utility in numerous design configurations with existing equipment. The one-piece input end cap provides multiple porting options, mounting options, and sensor placements for a variety of filtration system configurations, such as the system 10. The filters of the present invention will decrease design time, engineering costs, manufacturing costs, and inventory for the system 10 as well as provide other advantages as will be herein described.

The system 10, schematically illustrated in FIG. 15, includes filters positioned immediately adjacent and mounted directly to each other as herein described. The filters can be connected to each other in series or in parallel as will be described, and can be secured to a floor or mounting member 12. The system 10 additionally includes a pump 14 for directing fluid through the individual filters and is controlled through the controls found in the control box 16. The pump 14 is connected with the filters through hydraulic chambers (not shown for clarity). Additionally, a differential pressure sensor 18, or other sensor, can be provided in a stand-alone fashion on the input or the output lines from the filters. The filters may also include sensors as will be described. The mounting member 12 additionally could have a raised manifold at area 20 to which the filters are attached. The provision of the raised manifold at area 20 allows the hydraulic input and output chambers, if desired, to be connected to the various filters through the manifold from beneath the filters, as will be described in greater detail hereinafter.

Figure 16:
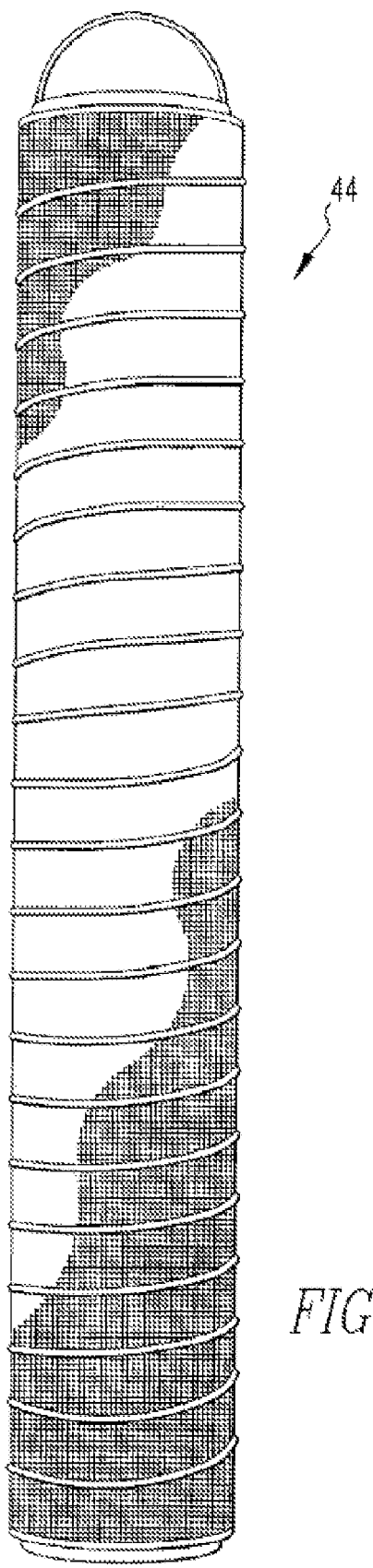
FIG. 16 is a perspective view of a filter element utilized in the filters of the present invention.

The individual filters of the system 10 can be connected directly to each other in series or connected in parallel, depending on the particular application. Each filter includes a closed end cap 30, which is attached via threads or otherwise secured to a canister 40, which extends along a longitudinal axis 42. The canister 40 can also be referred to as a filtration canister or a housing unit. The canister 40 and closed end cap 30 form a container or chamber for holding a replaceable filter element 44, which is shown separately in FIG. 16. A wide variety of replaceable filter elements 44, such as those sold by Schroeder Industries, can be utilized depending on the particular application. The individual filter element 44 may be formed, for example, from the EXCELLEMENT® series filter element, the ESAFE® Stand Alone Disposable Element, or even the CoreCentric® Coreless element, all sold by Schroeder Industries. These are representative-type elements that can be easily incorporated in a particular grade and would be determined based upon the flow rate and the cleanliness level desired and other associated factors with the particular application as is understood by those skilled in the art.

In particular, a feature for the filter of the present invention is the provision of a one-piece input end cap 50 secured to the canister 40. The one-piece input end cap 50 is modular in nature so as to allow flexibility in arrangement and connection as will be described in further detail hereinbelow. The one-piece input end cap 50 illustrated in the filter is a base since the filters illustrated in FIG. 15 are base-ported filters. The one-piece input end cap 50 of the present invention can also be utilized as top-ported filters or wall-mounted filters. Essentially, for top-ported filters, the filters illustrated in FIG. 15 would be inverted with the one-piece input end cap 50 located on the top and the closed end cap 30 located on the bottom. In this arrangement, the closed end cap 30 would be pinned to the canister 40 for removal and replacement of the filter element 44.

In replacing the filter element 44 in the filter, the closed end cap 30 is removed from the canister 40, typically by unthreading the closed end cap 30 to gain access to the interior. With the closed end cap 30 removed from the canister 40, the filter element 44 is pulled out and replaced with a new filter element 44, and the closed end cap 30 is reattached to the canister 40. In the top-ported configuration, the closed end cap 30 is pinned to the canister 40, such that rotation of the closed end cap 30 will also rotate the canister 40 and remove both the canister 40 and closed end cap 30 together with the attached filter element 44 for replacement of the filter element 44. The filter element 44 will be removed, a new filter element 44 positioned in the canister 40, and pinned closed end cap 30 then screwed into the top-ported one-piece input end cap 50.

Figure 1:
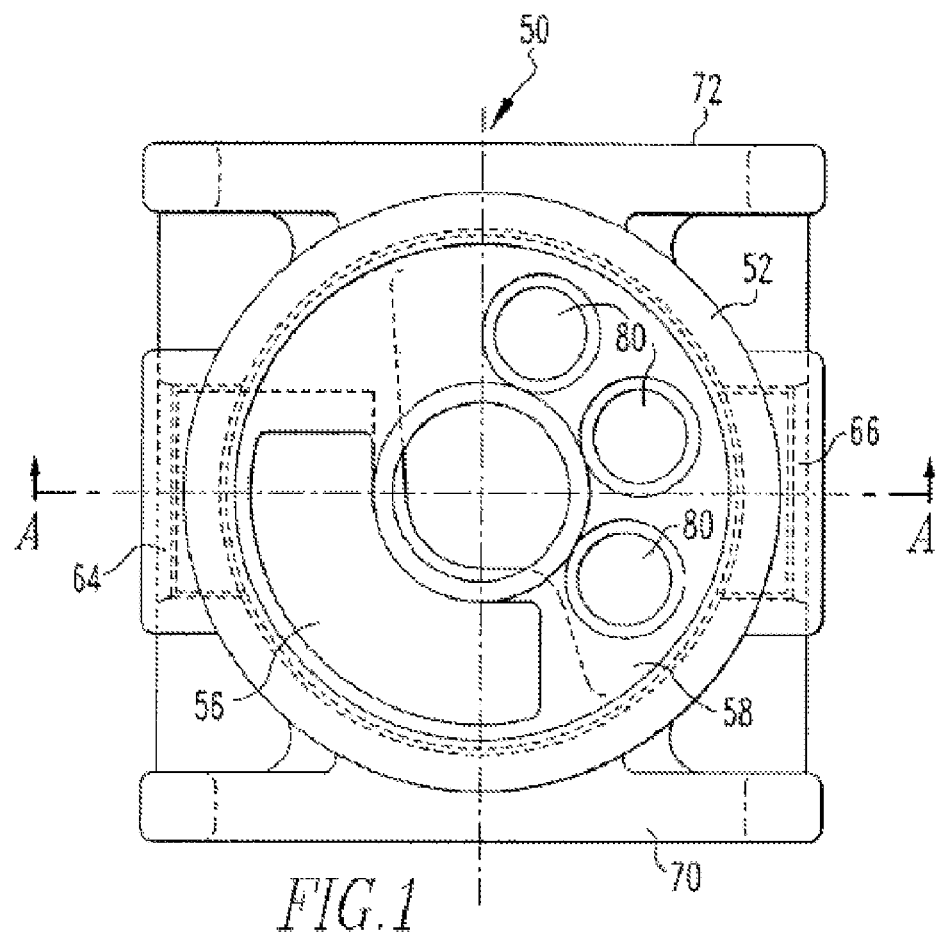
FIG. 1 is a top plan view of one embodiment of a one-piece input end cap of a filter according to the present invention.
Figure 2:
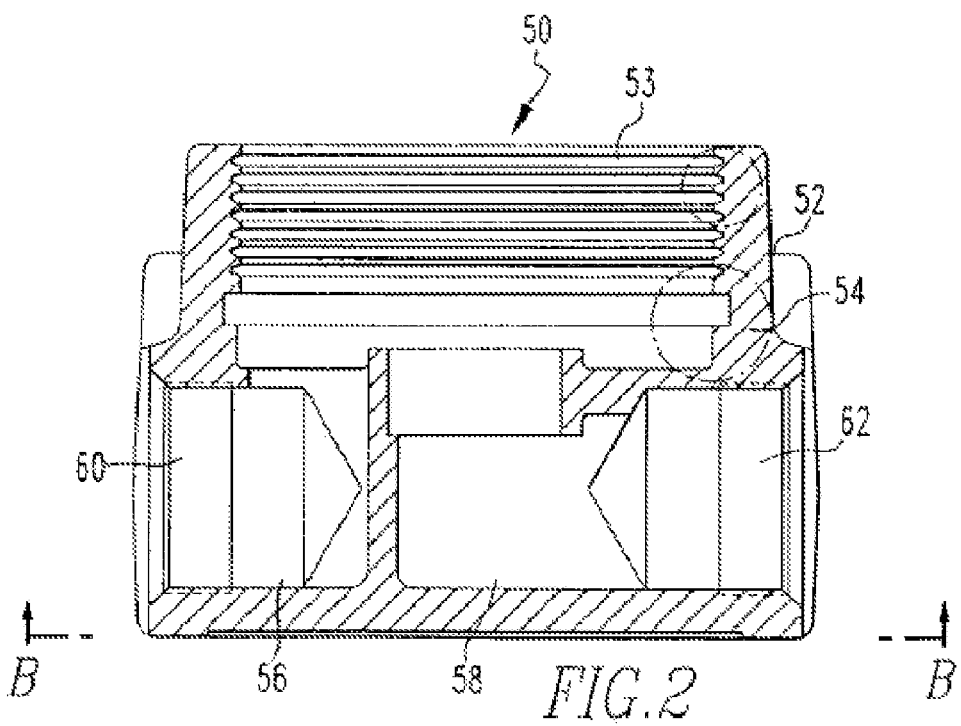
FIG. 2 is a sectional view of the one-piece input end cap taken a long line A-A of FIG. 1.
Figure 3:
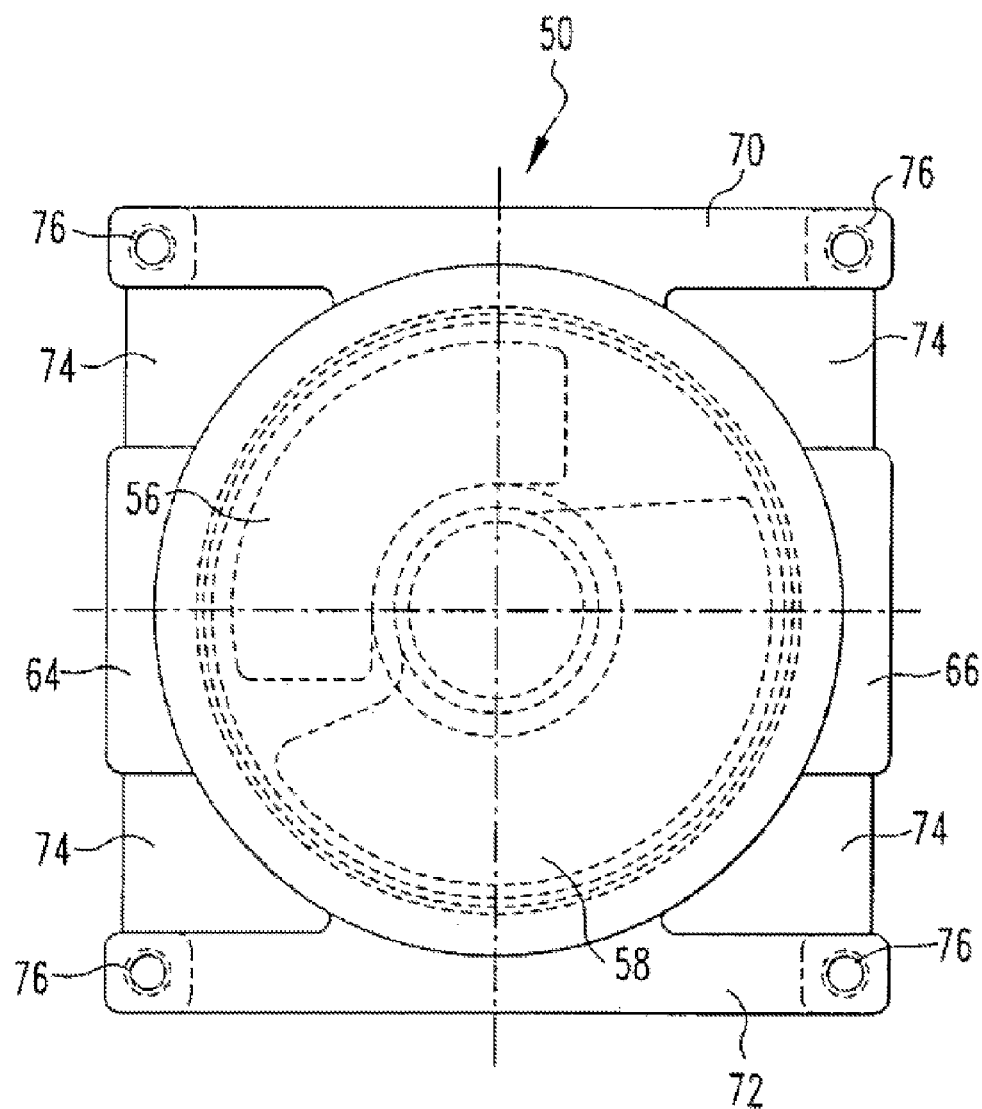
FIG. 3 is a bottom plan view of the one-piece input end cap of FIG. 1.

The one-piece input end cap 50 is shown in greater detail in FIGS. 1-3. Turning to FIG. 2, the upper neck portion of the one-piece input end cap 50 includes a cylindrical member 52 defining a cylindrical axis and having internal threads 53 for attachment to the canister 40. Below the internal threads 53 of the cylindrical member 52 is an O-ring groove 54, or other sealing member. The O-ring groove 54 would typically be for receipt of an O-ring sealing between the canister 40 and the one-piece input end cap 50. The one-piece input end cap 50 includes an input chamber 56 and an output chamber 58 positioned adjacent the filter element 44 and in fluid communication with the filter element 44, as understood in the art. If an out/in filter element is used, the input chamber must communicate with the outside of the filter element, and the output chamber must communicate with the inside of the filter element.

The filter element 44 will seal against the input chamber 56 and output chamber 58. Preferably, in an out/in filter element, the central opening of the tubular filter element 44 will seal against the output chamber 58, and the outside of the filter element 44 will be in contact with the input chamber 56. Hydraulic ports 60, 62 extend into the one-piece input end cap 50 and are in communication with the input chamber 56 and output chamber 58, respectively. The hydraulic port 60 combines with the input chamber 56 to form a hydraulic input chamber extending to and in fluid communication with the filter element 44. In a similar fashion, the hydraulic port 62 extends to the output chamber 58 to form a hydraulic output chamber extending from the filter element 44.

As shown in FIGS. 1 and 3, the one-piece input end cap 50 includes bosses 64, 66 on opposed sides thereof. The bosses 64, 66 allow for the placement of the hydraulic ports 60, 62, respectively, and may be square, rectangular, or circular as desired.

The one-piece input end cap 50 additionally includes two rectangular mounting plates or flanges 70, 72 on the sides thereof which extend the entire width of the one-piece input end cap 50. The mounting flanges 70, 72 are parallel to each other and essentially form an I-beam or H-beam configuration for the modular one-piece input end cap 50. Additionally, as illustrated in FIGS. 1-2, the perimeter or plan view of the one-piece input end cap 50 is substantially a square. In other words, the width or length of the mounting flanges 70, 72 substantially equal the distance between the mounting flanges 70, 72. The square configuration and the mounting flanges 70, 72, combine to allow a side-to-end attachment of adjacent filters in addition to the more conventional side-to-side attachment. The mounting flanges 70, 72 provide multiple attaching purposes for the individual applications.

The one-piece input end cap 50 additionally includes structural webbing 74 extending between the mounting flanges 70, 72 on the sides of the one-piece input end cap 50 and the bosses 64, 66 on the ends. The mounting flanges 70, 72 are primarily for attachment of the filters to adjacent filters and/or attachment of the filters to vertical surfaces in a freestanding manner, such as a wall, or a base structure, such as a manifold.

For attachment of the modular one-piece input end cap 50 and associated filters to the manifold area, the mounting flanges 70, 72 may be provided with threaded tap holes 76. The threaded tap holes 76 can receive studs for mounting the one-piece input end cap 50 in position. Additionally, as illustrated in FIG. 1, adjacent filters can be positioned next to each other with the mounting flange 70 or 72 positioned adjacent the end (for example, including the bosses 64, 66) of the adjacent filter in a side-to-end attachment. In general, in mounting adjacent filters in series, the mounting flange 70 or boss 66 of an upstream filter would be next to the boss 64 or the mounting flange 72 of an adjacent downstream filter. In any modular one-piece input end cap 50, the mounting flange 72 and boss 64 are adjacent the input chamber 56, and the mounting flange 70 and boss 66 are adjacent the output chamber 58. The square configuration allows for the end-to-side attachment and allows the units to be secured together by a bolt extending through one mounting flange 70, 72 into the end face of an adjacent mounting flange 70, 72 as illustrated in FIG. 15. Additionally, the mounting flanges 70, 72 essentially form the H- or I-beam configuration to give the necessary access for attaching adjacent filters in a simple fashion.

A key feature of the present invention is the multiple porting options offered by the present invention. In particular, the hydraulic ports 60, 62 need not be positioned in the bosses 64, 66. As shown in FIGS. 1 and 3, both the input chamber 56 and the output chamber 58 are generally kidney-shaped chambers extending more than 90 degrees around the axis of the cylindrical member 52. Consequently, the input chamber 56 can be accessed by the hydraulic port 60 positioned in either the boss 64, the mounting flange 72, or in the bottom of the modular one-piece input end cap 50. As shown in FIG. 3, the mounting flange 70 is positioned adjacent the input chamber 56. In a similar fashion, the hydraulic port 60 can alternatively extend into the input chamber 56 from the bottom of the one-piece input end cap 50 in a direction extending along the longitudinal axis 42 of the filtration canister 40. Essentially, the input chamber 56 allows the input hydraulic port 60 to extend into the one- piece input end cap 50 from any of three mutually perpendicular directions as desired by the user. In a similar fashion, the output hydraulic port 62 can be positioned to extend from the modular one-piece input end cap 50 from any of three mutually perpendicular directions including the longitudinal axis 42 of the canister 40.

This modular configuration is a key feature of the present invention, allowing the single modular one-piece input end cap 50 to be utilized in a wide variety of design applications. For example, there are effectively nine separate configurations that are possible for modular one-piece input end cap 50 having one inlet hydraulic port 60 and one outlet hydraulic port 62. Multiple configurations can further be obtained when the modular one-piece input end cap 50 is rotated 90°, 180°, and 270°. Additional modifications can include the provision of multiple inlet and/or multiple outlet hydraulic ports provided in any of the three mutually perpendicular directions described. In considering filtration systems of multiple filters in series or in parallel, multiple mounting options and respective positioning provide numerous options for easily adapting the system 10 to environmental limitations.

The location and direction of the hydraulic ports 60, 62 are driven largely by the design configurations of the particular system. For example, where the filters are to be utilized in series, the output of the first filter may position the hydraulic port 62 in the mounting flange 70, which will be attached to an adjacent modular one-piece input end cap 50 which may position the input hydraulic port 60 in the boss 64 connected directly to the adjacent modular one-piece input end cap 50.

The mounting flanges 70, 72 and bosses 64, 66 are adapted for direct face-to-face connection with either the bosses 64, 66 or mounting flanges 70, 72 of an adjacent modular one-piece input end cap 50 to prevent subsequent hydraulic coupling lines being necessary for attaching adjacent filters. Another advantage of the present invention is that the series of adjacent filters need not extend in a continuous line but, due to the square configuration, can extend in a perpendicular direction to each other.

FIGS. 8-A-13-B illustrate the different porting combinations and mounting options available that can be achieved as described above. FIGS. 8-A-10-B show filtration systems with two of the filters of the present invention in series with the inlet and outlet porting options illustrated. FIGS. 8-A and 8-B illustrate a side-to-end configuration with the corresponding porting options. FIGS. 9-A and 9-B illustrate a side-to-side configuration. FIGS. 10-A and 10-B illustrate an end-to-side configuration. The distinctions between FIGS. 8-A-10-B are the available porting options and the different mounting options for securing the respective system 10 to its environment. It should be understood that the porting options also illustrate the possible sensor locations which may also affect the desired filtration system. FIGS. 11-A-13-B illustrate some of the porting combinations and mounting combinations available when three filters are placed in series. FIG. 11-A illustrates a side-to-end-to-side configuration with corresponding porting options. FIG. 12-A illustrates a side-to-side-to-side configuration. Note FIGS. 13-A-13-B illustrate the perpendicular arrangement of a block of three or more filters in a system 10. Again, the distinctions between FIGS. 11-A-13-B are made to illustrate the available porting options and the different mounting options for securing the respective system 10 in its environment.

As shown in FIG. 1, the modular one-piece input end cap 50 easily accommodates conventional bypass valve ports 80 which will communicate with the output chamber 58, as known in the art. The number of bypass valve ports 80 is typically selected based upon the desired flowthrough.

Figure 4:
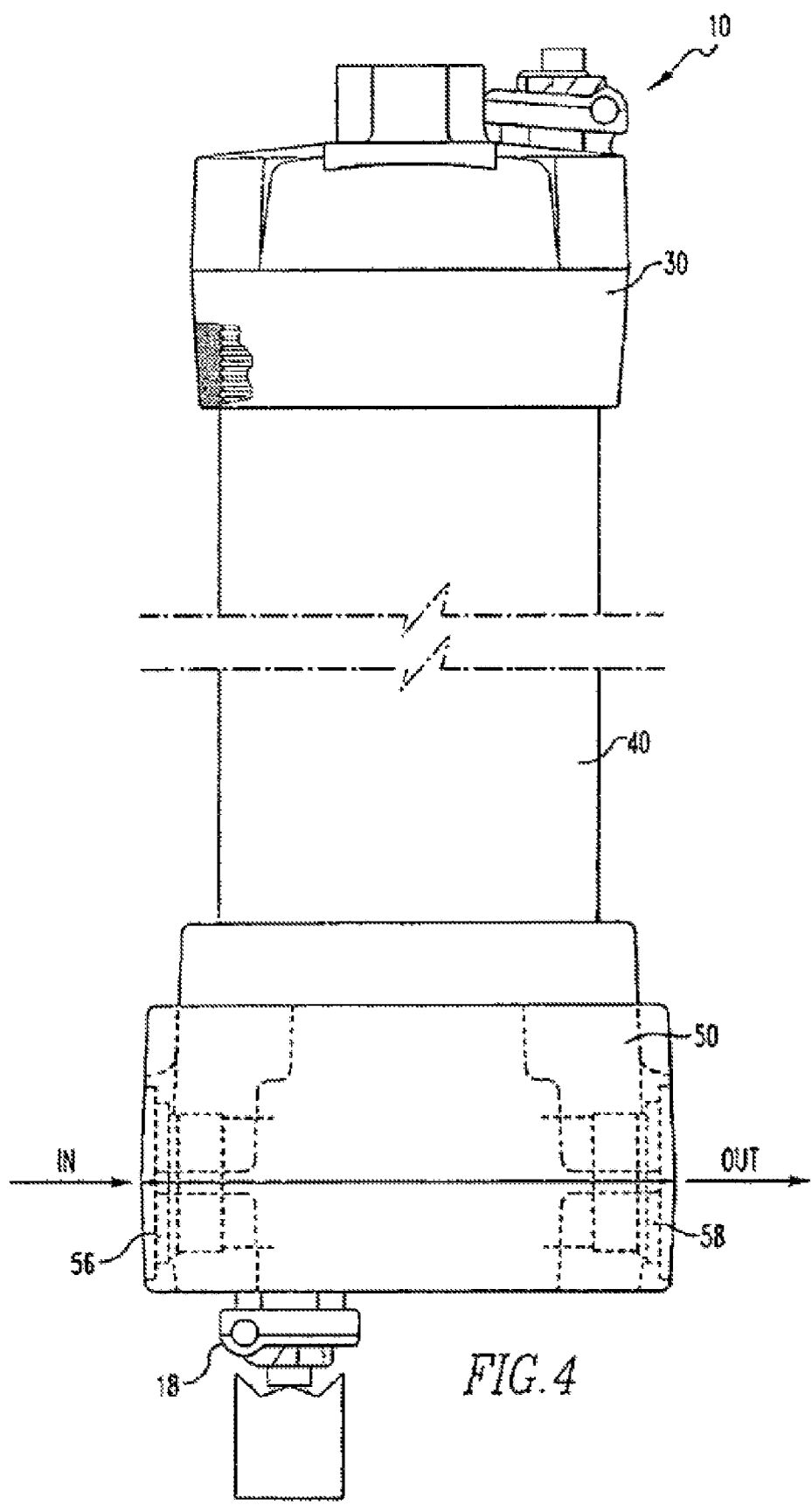
FIG. 4 is a schematic side view of a second filtration system utilizing a filter of FIG. 15.
Figure 5:
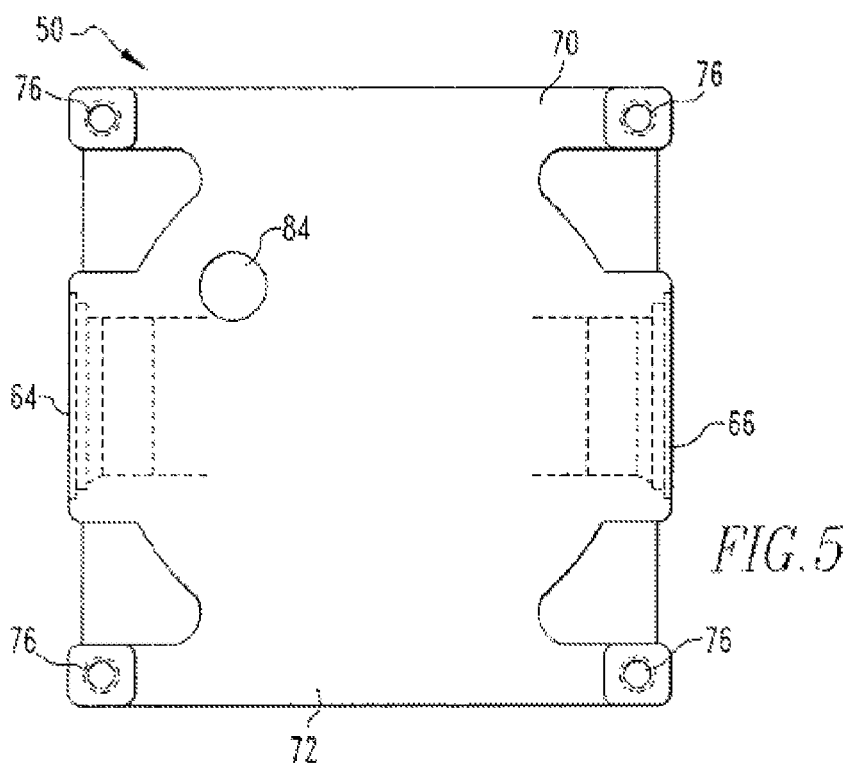
FIG. 5 is a bottom plan view of the filter with a sensor removed from the filtration system illustrated in FIG. 4.
Figure 6:
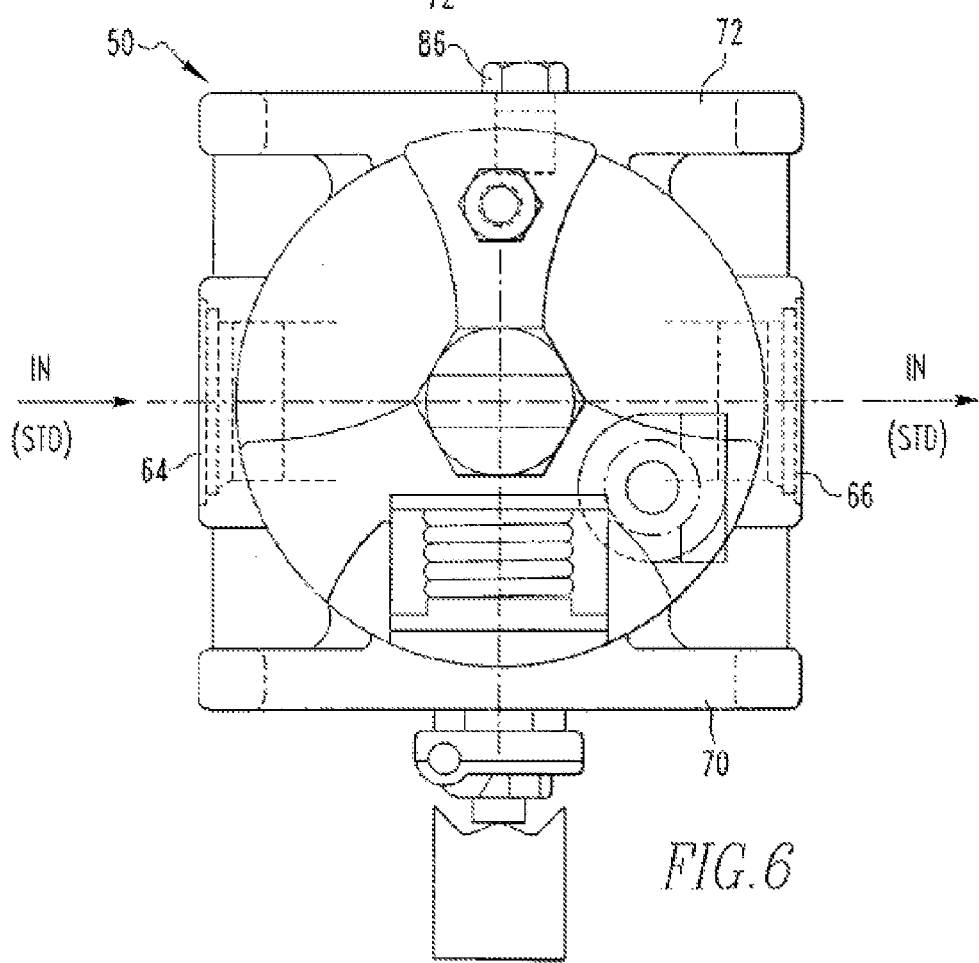
FIG. 6 is a top view of a modified version of the filter illustrated in FIG. 4.
Figure 7:
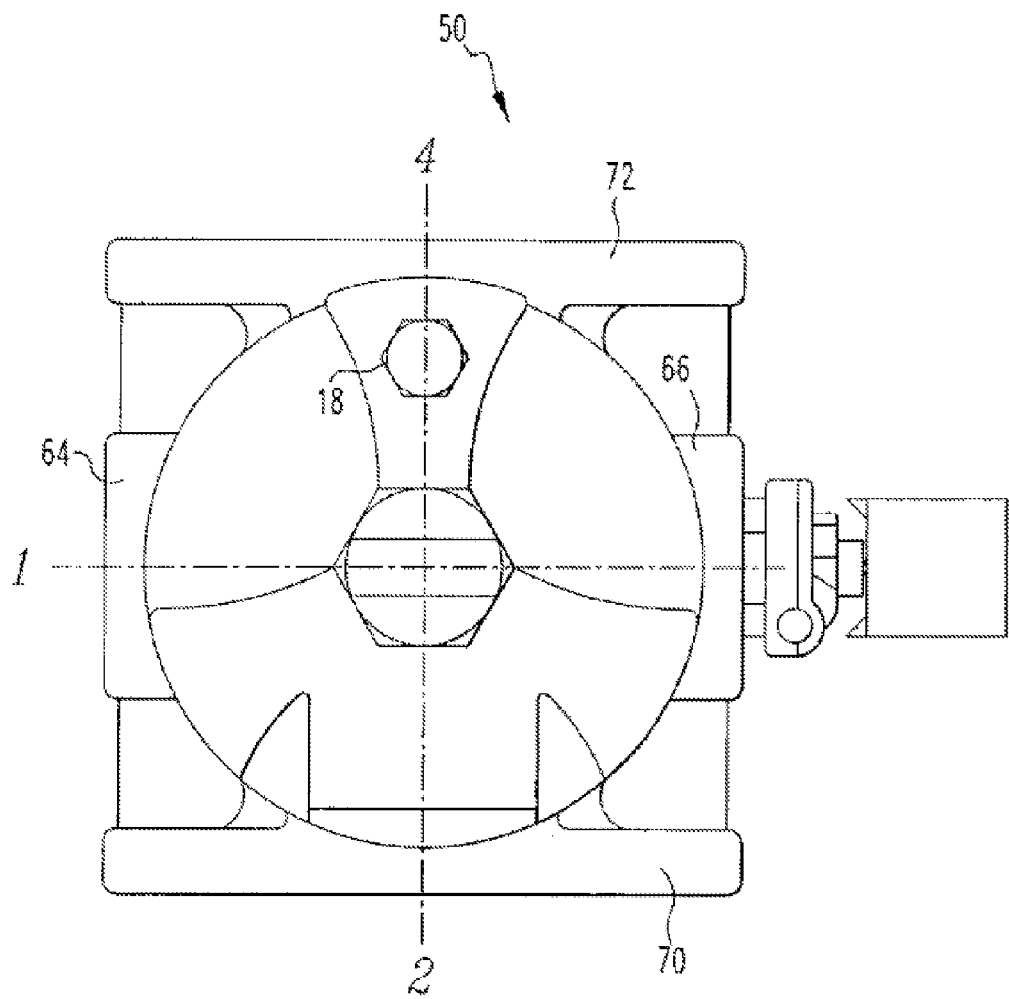
FIG. 7 is a top plan view of a modified version of the filter illustrated in FIG. 4.

FIG. 4 illustrates another system 10 utilizing a filter according to the present invention. The filter has a closed end cap 30, canister 40, filtration element 44 (not shown), and modular one-piece input end cap 50. Additionally, the modular one-piece input end cap 50 of the present invention allows for easy placement of a sensor, such as a differential pressure sensor 18 in the modular one-piece input end cap 50. The differential pressure sensor 18 will be typically positioned in communication with the input chamber 56. However, sensors may also be provided on the output chamber 58 in communication with the output chamber 58. The differential pressure sensor 18 essentially requires an indicator port 84 to communicate with the input chamber 56. As with the position of the input hydraulic port 60, the differential pressure sensor 18 can be provided in any one of three mutually perpendicular directions on the input chamber 56 as well as any of three mutually perpendicular directions on the output chamber 58. This allows great flexibility in the position of sensors in the filter according to the present invention. For example, FIGS. 5-7 show alternative locations for the differential pressure sensor 18 within the present invention. The embodiment illustrated in FIGS. 4-7 additionally shows the ease of incorporation of a drain plug 86 in the modular one-piece input end cap 50 of the present invention or another differential pressure-sensor 18 on the end cap 30 in the filter of the present invention. The modular one-piece input end cap 50 maintains all of the porting options.

Figure 14:
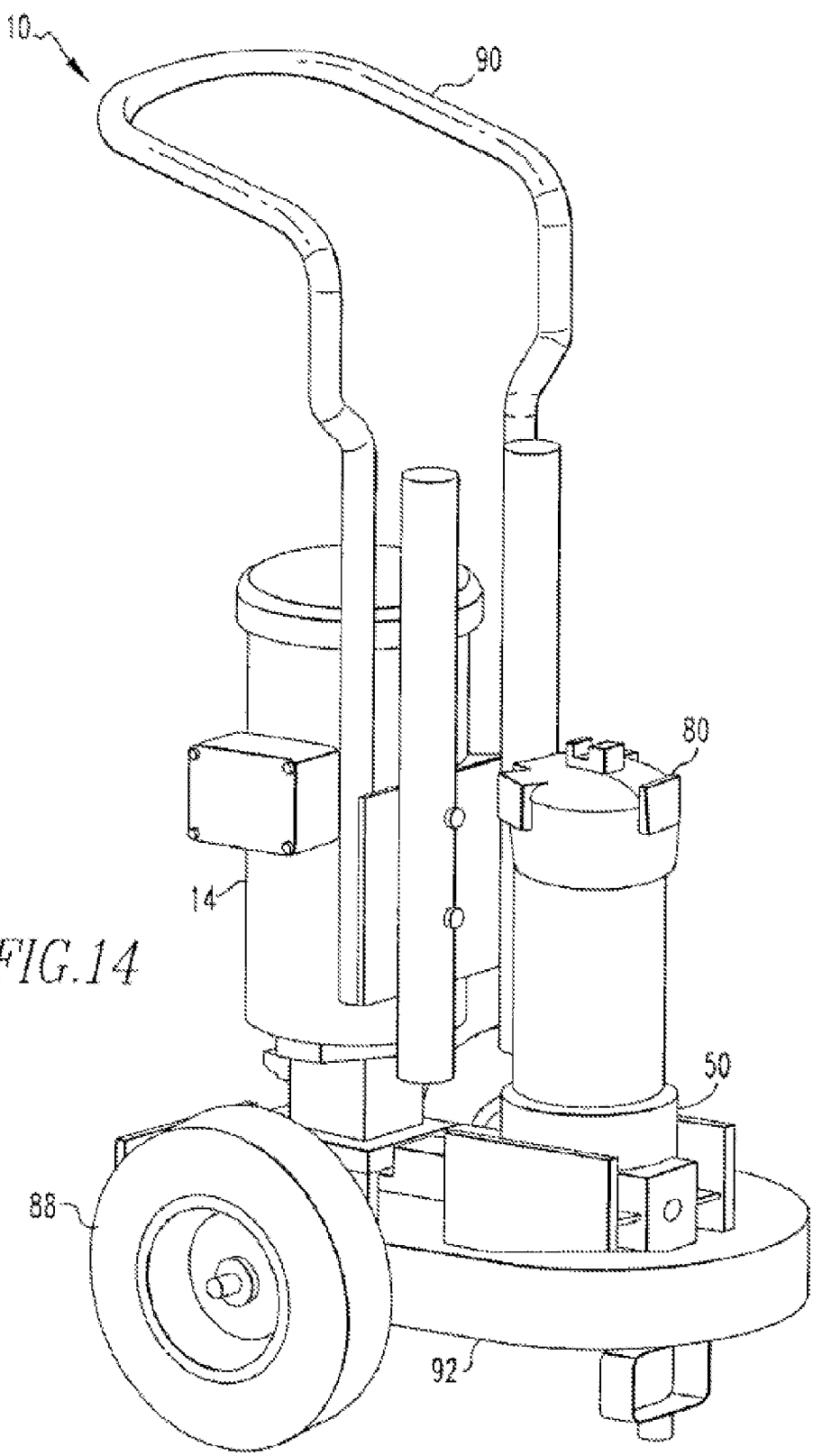
FIG. 14 is a portable filter according to another embodiment of the present invention.

FIG. 14 illustrates another system 10 according to the present invention in which the filter is formed as a portable system 10. Here, pump 14 is mounted to a mounting member 12, which is movable with the wheels 88 and the handle 90. In this embodiment, the one-piece input end cap 50 is molded integrally with a manifold 92 extending directly to the pump 14. This embodiment is merely intended to show the flexibility of the one-piece input end cap 50 of the present invention which can be utilized and molded for a particular application with minimal engineering modifications.

Thus, the present invention adds a degree of modularity for designing filtration systems by allowing adjacent filters to be directly attached to each other in a variety of configurations. This can be done by allowing the modular one-piece input end cap to be utilized as a base-ported filter or a top-ported filter. While not all the mounting options are described herein, the modular one-piece input end cap is designed to allow for maximum flexibility, for example, wall mounting, top porting and base porting. In addition, the modular one-piece input end cap is designed to have the porting options which come in and go out of any three mutually perpendicular directions, as well as to have sensors mounted in any one of three mutually perpendicular directions. Another feature of the modular one-piece input end cap is that of the H- or I-beam shape which allows for the necessary structural and for side-to-side or side-to-end attachment configurations. The use of the present invention simplifies the engineering design process. System cost has substantially decreased as will be appreciated by the manufacturer and contractor/end user. The present invention allows for the flexibility and adaptability of a hydraulic filter that can be placed in various system configurations and different environments.

The particular embodiments illustrated in the present application are intended to be illustrative of the present invention and not restrictive thereof. It would be obvious to one of ordinary skill in the art that various modifications may be made to the present invention without departing from the spirit and scope thereof. The scope of the present invention is intended to be defined by the appended claims and equivalents thereto.

The invention claimed is:

1. A filtration system comprising: at least two filters mounted adjacent to each other, each filter comprising:
   A) a canister extending along a longitudinal axis;
   B) a closed end cap at one end of the canister attached to the canister for closing one end thereof;
   C) a filter element contained within the canister; and
   D) a modular one-piece input end cap for attachment to the canister, the one-piece input end cap comprising:
      i) a mounting portion including a cylindrical member for attachment to the canister;
      ii) a hydraulic input chamber extending to the filter element in the canister, said hydraulic input chamber being kidney shaped as viewed in a direction parallel to said longitudinal axis and is configured to be ported in any of three mutually perpendicular directions including one direction parallel to said longitudinal axis;
      iii) a hydraulic output chamber extending from the filter element in the canister, wherein the hydraulic output chamber is kidney shaped as viewed in a direction parallel to said longitudinal axis and is configured to be ported in any of three mutually perpendicular directions including one direction parallel to said longitudinal axis;
      iv) bosses on two opposed sides of the modular one-piece input end cap, one boss configured to allow for the placement of a hydraulic port there in extending to the hydraulic input chamber and the other boss configured to allow for placement of a hydraulic port there in extending to the hydraulic output chamber; and v) mounting flanges on two opposed sides of the modular one-piece input end cap, each mounting flange extending the entire width of the modular one-piece input end cap between the opposed sides containing the bosses, one flange configured to allow for the placement of a hydraulic port there in extending to the hydraulic input chamber and the other flange configured to allow for the placement of a hydraulic port there in extending to the hydraulic output chamber.

2. The filtration system of claim 1, wherein at least one one-piece end cap further includes a sensor mounted in a port extending to one of the hydraulic input chamber and the hydraulic output chamber in one of said three mutually perpendicular directions, and at least one input end cap further including a raised annular wall concentric with the cylindrical member and positioned between the input chamber and the output chamber in the flow path.

3. The filtration system of claim 2, wherein the sensor of the at least one end cap is a pressure sensor, and wherein the cylindrical member includes a groove for positioning an o-ring.

4. The filtration system of claim 1, wherein filters are connected in series and wherein the hydraulic output chamber of one of the one-piece input end caps is attached directly to the hydraulic input chamber of the one-piece input end cap of a second adjacent filter through coupling of flanges on the adjacent one-piece input end caps.

5. The filtration system of claim 4, wherein three filters are connected in series and wherein the hydraulic input chamber of the one-piece input end cap of the second filter is attached directly to the hydraulic output chamber of the one-piece input end cap of a third adjacent filter through coupling of flanges on the adjacent one-piece input end caps.

6. The filtration system of claim 1, wherein the one-piece input end cap of each filter includes a base having a substantially square perimeter where the one-piece input end cap of at least one filter is attached to an adjacent one-piece input end cap.

7. The filtration system of claim 6, wherein the mounting flanges of each one-piece input end cap of each filter are substantially rectangular mounting flanges.

8. The filtration system of claim 7, wherein the pair of bosses on opposite sides of the one-piece input end cap of each filter are rectangular.

9. The filtration system one-piece input end cap of claim 8, wherein the mounting flange of one one-piece input end cap of one filter attaches the filter directly to an adjacent mounting flange of one one-piece input end cap of one adjacent filter.

10. The filtration system of claim 9 wherein the one-piece input end cap includes an internally threaded cylindrical member for attaching the canister thereto.

11. The filtration system of claim 10, wherein the one-piece input end cap of each filter is a base for the filter.

12. The filtration system of claim 10, wherein the one-piece input end cap is a top end for the filter.

13. A filtration system comprising: at least two filters mounted adjacent to each other, each filter comprising:
A) a canister extending along a longitudinal axis having threads at opposed ends thereof;
B) a closed end cap at one end of the canister attached to the canister for closing one end thereof;
C) a filter element contained within the canister; and
D) a modular one-piece input end cap at an opposite end of the canister from the closed end cap, the one-piece input end cap attached to the canister through a cylindrical member having threads, wherein the one-piece input end cap includes a hydraulic input chamber extending to the filter element, wherein said hydraulic input chamber is kidney shaped as viewed in a direction parallel to said longitudinal axis and is configured to be ported in any of at least two mutually perpendicular directions including one direction extending along the longitudinal axis of the canister, and the one-piece input end cap includes a hydraulic output chamber extending from the filter element, wherein said hydraulic output chamber is kidney shaped as viewed in a direction parallel to said longitudinal axis and is configured to be ported in any of at least two mutually perpendicular directions including one direction extending along the longitudinal axis of the canister.

14. The filtration system of claim 13, further including a sensor mounted in a port extending to one of the hydraulic input chamber and the hydraulic output chamber of at least one filter in one of said three mutually perpendicular directions.

15. The filtration system of claim 14, wherein the sensor is a pressure sensor.

16. The filtration system of claim 13, wherein the one-piece input end cap of at least one filter has mounting flanges on two opposed sides of the one-piece input end cap, each mounting flange extending the entire width of the one-piece input end cap and configured to allow for the placement of a hydraulic port there in extending to one of the hydraulic input chamber or the hydraulic output chamber, wherein the flanges attach directly to the mounting flanges of the one-piece input end cap of a second adjacent filter.

17. The filtration system of claim 16, wherein each the modular one-piece input end cap includes bosses on two opposed sides of the one-piece input end cap, each boss configured to allow for the placement of a hydraulic port there in extending to one of the hydraulic input chamber or the hydraulic output chamber.

18. The filtration system of claim 13, wherein the one-piece input end cap of each filter includes a base having a substantially square perimeter where the one-piece input end cap is attached to an adjacent one-piece input end cap.

19. The filtration system of claim 18, wherein each one-piece input end cap includes mounting flanges on two opposed sides of the one-piece input end cap, each mounting flange extending the entire width of the one-piece input end cap and configured to allow for the placement of a hydraulic port there in extending to one of the hydraulic input chamber or the hydraulic output chamber and wherein mounting flanges of each one-piece input end cap of each filter are substantially rectangular.

20. The filtration system of claim 19, wherein the one-piece input end cap of each filter includes a pair of bosses on opposite sides of the one-piece input end cap, and wherein one boss provides a hydraulic port extending to the hydraulic input chamber and the other boss provides a hydraulic port extending to the hydraulic output chamber.

21. The filtration system of claim 19, wherein at least one of the mounting flanges directly attaches the one-piece input end cap of at least one filter to the adjacent one-piece input end cap of the adjacent filter.

22. The filtration system of claim 21, wherein the mounting flange of at least one filter attaches the filter to an adjacent mounting flange.

23. The filtration system of claim 22, wherein the threaded cylindrical member of the one-piece input end cap of at least one filter is an internally threaded cylindrical member for attaching the canister thereto.

24. The filtration system of claim 23, wherein the one-piece input end cap is a base for the filter.

25. The filtration system of claim 22, wherein the one-piece input end cap of at least one filter is a top end for the filter.

26. A filtration system comprising: at least two filters mounted adjacent to each other, each filter comprising:
   a canister extending along a longitudinal;
   a closed end cap at one end of the canister attached to the canister for closing one end thereof;
   a filter element contained within the canister; and
   a modular one-piece input end cap at an opposite end of the canister from the closed end cap, the one-piece input end cap attached to the canister, wherein the one-piece input end cap includes a hydraulic input chamber extending to the filter element, wherein said hydraulic input chamber is kidney shaped as viewed in a direction parallel to said longitudinal axis and is configured to be ported in any of three mutually perpendicular directions including one direction extending parallel to the longitudinal axis of the canister, and the one-piece input end cap includes a hydraulic output chamber extending from the filter element, wherein said hydraulic output chamber is kidney shaped as viewed in a direction parallel to said longitudinal axis and is configured to be ported in any of three mutually perpendicular directions including one direction extending parallel to the longitudinal axis of the canister, bosses on two opposed sides of the modular one-piece input end cap, one boss configured to allow for the placement of a hydraulic port there in extending to the hydraulic input chamber and the other boss configured to allow for the placement of a hydraulic port there in extending to the hydraulic output chamber, and mounting flanges on two opposed sides of the modular one-piece input end cap, each mounting flange extending the entire width of the modular one-piece input end cap between the opposed sides containing the bosses, one flange configured to allow for the placement of a hydraulic port there in extending to the hydraulic input chamber and the other flange configured to allow for the placement of a hydraulic port there in extending to the hydraulic output chamber.

27. A filtration system comprising:
   at least two filters mounted adjacent to each other, each filter comprising:
     a canister extending along a longitudinal axis;
     a closed end cap at one end of the canister attached to the canister for closing one end thereof;
     a filter element contained within the canister; and
     a connecting end cap for a filter directing input flow to the exterior of the tubular filter element and output flow from the interior of the tubular filter element, said connecting end cap comprising:
   a cup-shaped body defined by a cylindrical wall having threads and a cylindrical axis the same as a cylindrical axis of the canister, the open end of the cylindrical wall sized to receive the cylindrical canister through engaging threads and the closed end of the cup-shaped body being defined by a wall perpendicular to the cylindrical axis, said connecting end cap having an input and an output chambers adjacent the closed end, the input and output chambers being separated by a pair of walls positioned so that the inlet chamber is kidney shaped as viewed in a direction parallel to said longitudinal axis and abuts two port positions on the cylindrical wall ninety degrees apart around the cylindrical axis and such that the outlet chamber is kidney shaped as viewed in a direction parallel to said longitudinal axis and abuts two outlet port positions 180 degrees across from the inlet port positions, the outlet chamber being further enclosed by an interior wall generally parallel to the end wall and spaced therefrom, an axial opening in the interior wall for abutting the bottom end of the filter element, whereby the connecting end cap can be machined to have aligned input and output hydraulic ports and/or input and output ports at right angles to each other, and bosses on two opposed sides of the connecting end cap, one boss configured to allow for the placement of a hydraulic port there in extending to the hydraulic input chamber and the other boss configured to allow for the placement of a hydraulic port there in extending to the hydraulic output chamber, and mounting flanges on two opposed sides containing the bosses, each mounting flange extending the entire width of the connecting end cap between the opposed sides containing the bosses, one flange configured to allow for the placement of a hydraulic port there in extending to the hydraulic input chamber and the other flange configured to allow for the placement of a hydraulic port there in extending to the hydraulic output chamber.

28. The filtration system according to claim 27, wherein the outlet chamber of at least one filter abuts a port position in the end cap at a center thereof.

29. The filtration system according to claim 27, wherein the mounting flanges define a rectangular perimeter whereby first and second connecting end caps can be fastened together by the abutting faces of two adjacent flanges of the first and second connecting end caps or by the abutting face of a flange on a first connecting end cap and the abutting edges of two flanges on the second connecting end cap.

30. The filtration system according to claim 27, wherein a perimeter of each end cap is substantially square, and wherein the cylindrical member includes a groove for positioning an o-ring below the threads.

31. The filtration system according to claim 27, having an integral manifold extending away from an input port position and an integral pump base extending from the manifold.

32. A filtration system comprising: at least two filters mounted adjacent to each other, each filter comprising:
   A) a canister extending along a longitudinal axis;
   B) a closed end cap at one end of the canister attached to the canister for closing one end thereof;
   C) a filter element contained within the canister; and
   D) a modular one-piece input end cap at an opposite end of the canister from the closed end cap, the one-piece input end cap attached to the canister through a cylindrical member having threads, wherein the cylindrical member includes a groove for positioning an o-ring below the threads, wherein the one-piece input end cap includes a hydraulic input chamber extending to the filter element, wherein said hydraulic input chamber is kidney shaped as viewed in a direction parallel to said longitudinal axis and is configured to be ported in any of three mutually perpendicular directions including one direction extending parallel to the longitudinal axis of the canister, and the one-piece input end cap includes a hydraulic output chamber extending from the filter element, wherein said hydraulic input chamber is kidney shaped as viewed in a direction parallel to said longitudinal axis and is configured to be ported in any of three mutually perpendicular directions including one direction extending parallel to the longitudinal axis of the canister, and wherein the end cap includes a raised annular wall concentric with the cylindrical wall positioned between the input chamber and the output chamber, and bosses on two opposed sides of the connecting end cap, one boss configured to allow for the placement of a hydraulic port there in extending to the hydraulic input chamber and the other boss configured to allow for the placement of a hydraulic port there in extending to the hydraulic output chamber, and mounting flanges on two opposed sides of the modular one-piece input end cap, each mounting flange extending the entire width of the modular one-piece input end cap between the opposed sides containing the bosses, one flange configured to allow for the placement of a hydraulic port there in extending to the hydraulic input chamber and the other flange configured to allow for the placement of a hydraulic port there in extending to the hydraulic output chamber.

\* \* \* \* \*